United States Patent Office 3,092,368
Patented June 4, 1963

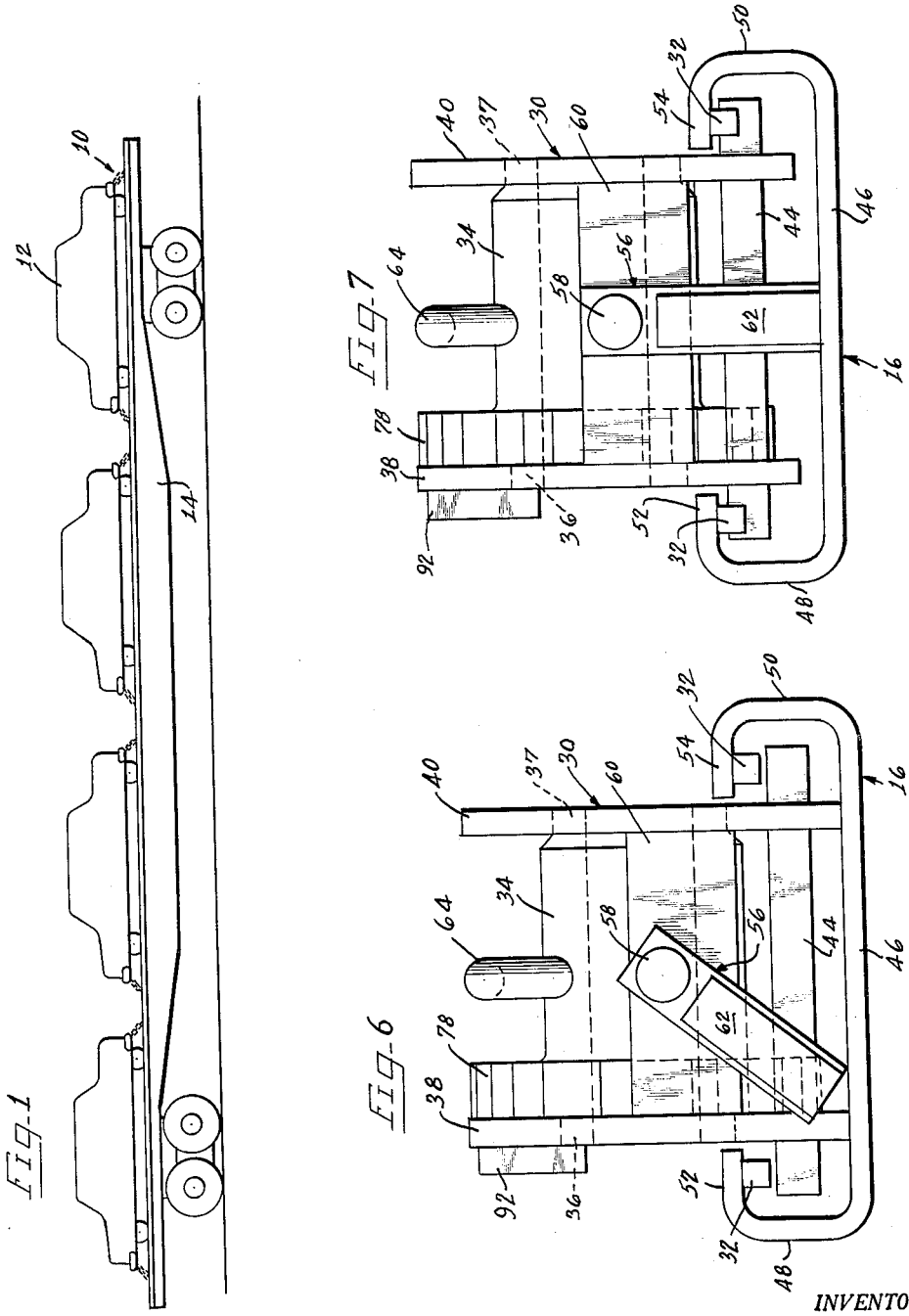

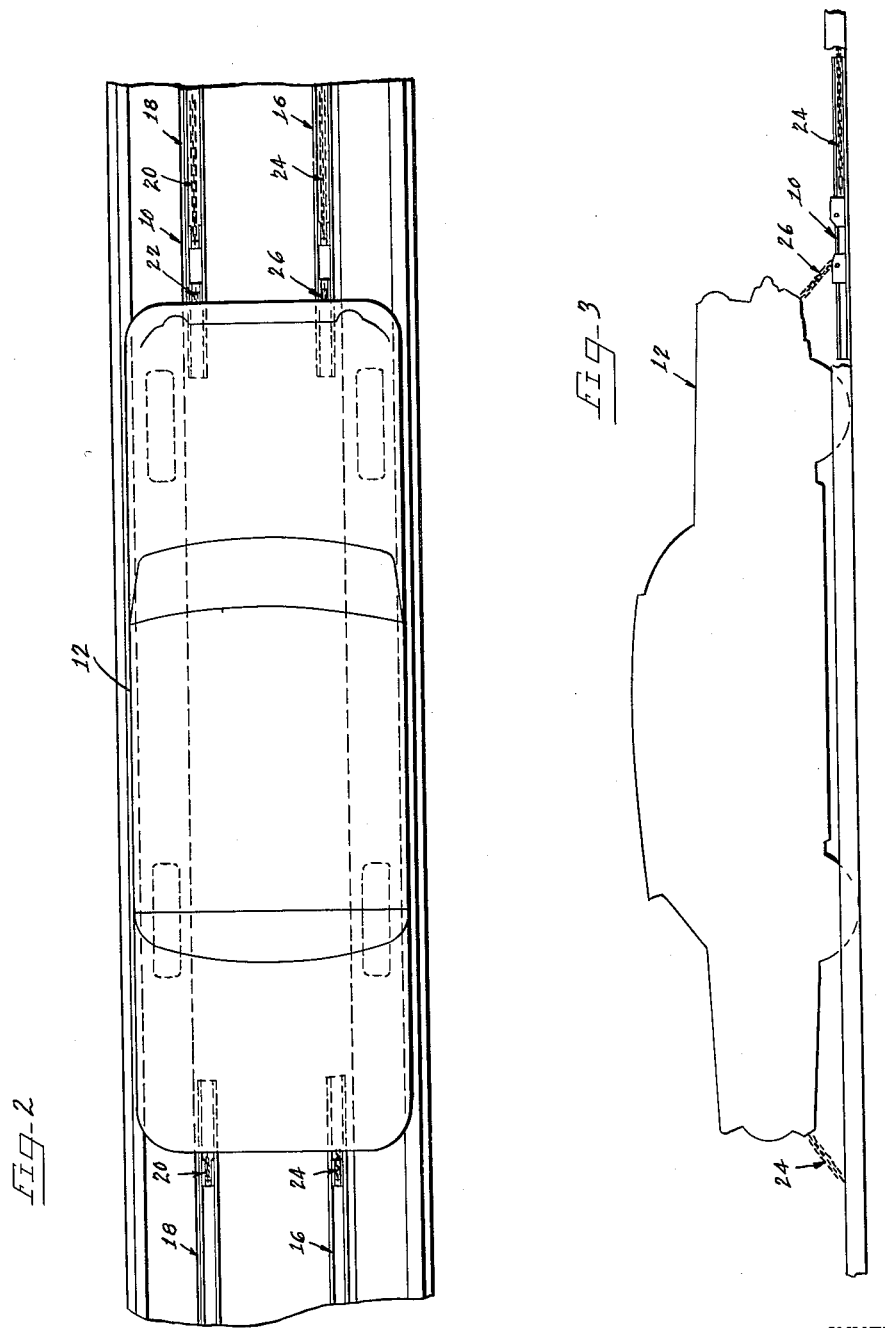

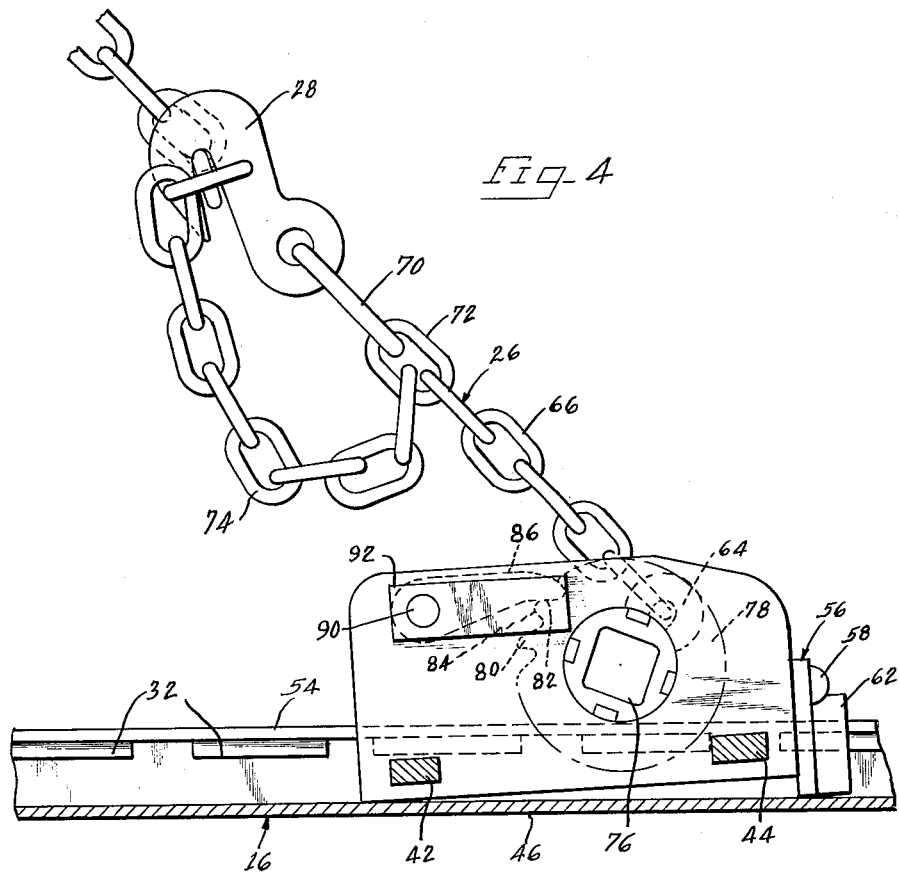
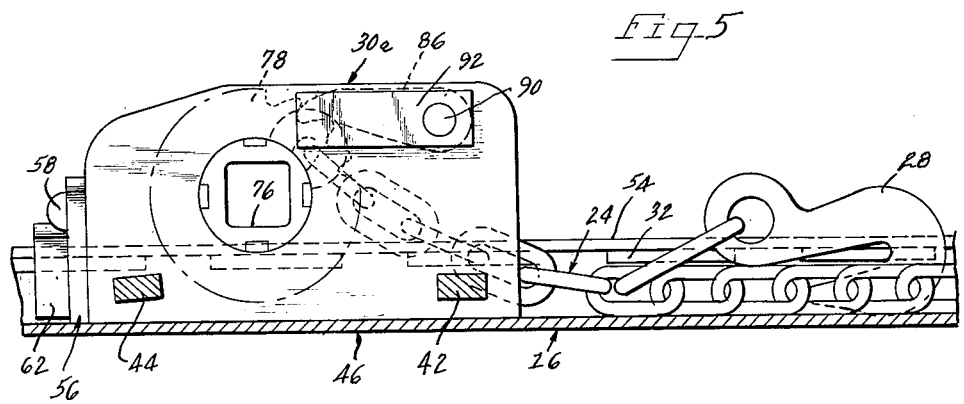

3,092,368
WINCH MECHANISM FOR VEHICLE TIE DOWN
Thomas E. McDowell, Oak Park, Ill., and Clifford C. Whiteford, Southfield, Mich.; said McDowell assignor to Brandon Equipment Company, Inc., Chicago, Ill., a corporation of Illinois, and said Whiteford assignor to Ford Motor Company, Dearborn, Mich., a corporation of Delaware
Filed Oct. 17, 1960, Ser. No. 63,106
3 Claims. (Cl. 254—164)

This invention relates to a tie down structure for use in transporting loads such as automotive vehicles or the like by rail, or otherwise, and more particularly to a tie down device which is adjustable by means of a winch in a manner which is unusually simple and entirely reliable.

In securing vehicles to a flat car or the like, it has generally been difficult for the operator to obtain access to the tie down means to effect adjustment of tension in chains or the like connected to the vehicles, and such adjustment has also required considerable manipulation of complex parts. Also, positioning of the tie down means in a desired holding position and secure engagement thereof in such position could not be readily accomplished in a satisfactory manner.

The present invention provides a vehicle tie down device which includes channel members which are preferably secured in parallel spaced relationship longitudinally of a flat car or other carrier on which the vehicle or load is to be shipped, and a series of axially spaced holding stops which are preferably individual projections formed in mutual registration in the inner sides of the channels. In accordance with the invention, adjustment of tension in a tie down chain or other flexible element which may be fastened to the load is accomplished by winch means slidably positioned in the individual channel members, and having anchor means normally passing beneath the projections but engageable therewith upon elevation of the winch means to a predetermined extent. The winch means may each include a pair of parallel plates journalling a drum having means for securing a chain or the like thereto, and ratchet means permitting rotation of the drum in one direction so as to increase tension in the chain and preventing rotation in the other direction.

The difficulties encountered previously in obtaining access to a tie down device for adjusting the tension in flexible holding elements thereof have been eliminated, since the operator may insert a crank of a suitable length into a mating socket in the drum from a position at one side of the vehicle. The parallel winch plates are received between inwardly extending opposed flanges of the channel structure, with the socket preferably being above the channel for receiving the crank. The anchor means desirably include a pair of transverse anchor members or bars which extend through the bottom portions of the plates to engage with a desired set of projections or stops in the channel structure and with said flanges, in a locking position thereof.

Also in accordance with the invention, means are provided which afford selective positive locking engagement of the anchor bars with the projections or stops, and which may be released to permit movement of the anchor bars beneath the projections for axial adjustment of the position of the winch along the channel structure. Thus, in order to lock the winch at a desired axial position in the channel structure, a lever or camming member is pivotally secured to a cross piece extending between the plates of the winch; and a handle block or the like may be formed on the lever so that it may be pivoted from a normal position wherein it is angularly offset from the vertical and wherein the winch plates are slidably supported on the channel bottom, to a substantially vertical position. As it is turned toward the vertical position, the lever may cam against the channel bottom to elevate an end of the winch structure and the anchor means thereon upwardly into a position to engage with the projections in holding relationship therewith. However, elevation of the end of the winch may also be accomplished directly, as by turning the drum to take up slack in the chain, or otherwise, so that the lever will automatically pivot to its vertical position by gravity as assisted by the weight of the block thereon. The pivotal lever is supported on the bottom of the channel structure in the vertical position thereof. In a preferred form of the invention, the projections are welded or otherwise secured to the inwardly extending flanges on the channel structure, in depending relationship thereto.

Accordingly, it is an object of the present invention to provide a tie down device for securing vehicles or other loads to railroad cars or the like, which is characterized by a high degree of accessibility so that the operator does not have to maneuver into an awkward position in adjusting the tension in the tie down device.

Another object of the invention is to provide a device as described affording complete flexibility in positioning the winch means thereof for the most favorable attaching location for a vehicle or other load.

Another object of the invention is to provide a device as described which permits automatic location and retention of the winch means in the channel.

Another object of the invention is to provide a tie down device as described wherein adjustment of tension on the tie down chain is especially simple since only a partial or slight amount of rotation of the winch will be needed to effect a desired degree of adjustment.

Another object of the invention is to provide a tie down device as described having a positive locking action afforded by means for positively elevating the winch into holding engagement in a channel structure therefor.

Another object of the invention is to provide a tie down device as described which is extremely compact and which can be used with vehicles having an unusually low under-clearance.

Another object of the invention is to provide a device as described wherein the winch drum may be held positively against rotation in one direction to maintain a desired holding tension in a very secure manner, and which is readily rotatable in the other direction for adjustment of the tension in the chain.

Other objects and advantages of the invention will become apparent as the description proceeds in accordance with the drawings which illustrate a preferred embodiment of the invention.

In the drawings:

FIGURE 1 is a diagrammatic side elevational view of a railroad car carrying vehicles secured thereto in accordance with the present invention;

FIGURE 2 is a top plan view of a vehicle secured to a railroad car or the like by the tie down structure of the invention;

FIGURE 3 is a side elevational view of the structure shown in FIGURE 2;

FIGURE 4 is an enlarged view, partly in vertical section, of winch means according to the present invention in load-holding position.

FIGURE 5 is a view corresponding to the view of FIGURE 4 but showing the winch positioned for holding loads on an opposite side from the embodiment of FIGURE 4 and with flexible holding means therefor in stored condition;

FIGURE 6 is a front view, partly in vertical section, of the winch means of the invention in disengaged, slidable relationship to the channel structure; and FIGURE 7 is a view corresponding to the view of FIGURE 6 and showing the winch means entering engaged, locking relationship with the channel structure.

Referring now to the drawings and in particular to FIGURES 1 through 3, a tie down structure 10 is shown in operative relationship to vehicles 12 and securing the vehicles for transit on a railroad flat car 14. It will be understood, however, that the tie down structure 10 is also applicable for securing other types of loads and to other types of transport means or support surfaces. The tie down structure 10 preferably includes longitudinally extending channels 16 and 18 in which are anchored successive pairs of tie down chains 20 and 22, and 24 and 26, connected to the frame structure of the vehicles 12 (or otherwise) by suitable means such as a grab hook or the like 28 adjustably engaging a portion of the chains and anchored in the respective channels 16 and 18 by winch or drum means 30 according to the present invention engaging holding means such as stops or projections 32 positioned in axially proximately spaced relationship and in lateral registration in opposite sides of the channels, as hereinafter further described. However, other forms may be utilized for the holding means 32, as, for example, a continuous bar (not shown) on the inner sides of the channel members having spaced recesses or stops in lower edge portions thereof. The channels 16 and 18 may be formed in sections, as shown, and may also be associated with suitable vehicle runways.

The channels may be connected in various relationships and secured to the flat cars 12 by welding them to plates bolted to the deck surface, or otherwise. The individual channel sections may be formed with stop means at their opposite ends, such as bolts welded in position, and it will also be appreciated that the channel sections may be formed in a single length of channel, as by using a central channel rather than a pair of channels, or may be formed in a raised deck plate or the like and utilized in a multi-deck construction, within the scope of the invention.

The winch means 30 affords a high degree of accessibility for the operator, as well as ease and flexibility of adjustment, compactness and positive holding action. Thus the winch means includes a drum 34 journalled by means of reduced trunnion extensions 36 and 37 in axially aligned, parallel and spaced side plates 38 and 40.

In order to afford selective engagement of the winch means 30 with the holding means 32, anchoring means are provided which preferably comprise a pair of anchor members or bars 42 and 44 extending through the lower front and rear portions of the plates 38 and 40 in fixed relationship thereto so that the ends of the said anchor bars are disposed outwardly of the side plates by an extent such as to afford a solid abutting relationship to the holding means in the locking position thereof, as hereinafter further described.

The winch means 30 is illustrated in FIGURE 6 with respect to a channel section 16 having a substantially U-shaped cross-sectional configuration and including a bottom wall 46, side walls 48 and 50 and integrally formed upper marginal flanges 52 and 54 extending inwardly and in spaced apart relationship such as to receive the side plates 38 and 40 of the winch means therebetween in proximate slidable relationship.

The projections 32 may be secured beneath the flanges 52 and 54 by welding or otherwise, it being understood, however, that other forms of connection of the projections 32 to the channels (as, for example, to the side walls 48 and 50), are encompassed within the scope of the invention. Accordingly, the side plates 38 and 40 of the winch means 30 may slide in supported relation along the bottom 46 of the channel structure in a disengaged position of the winch means as seen in FIGURE 5, with the bars 42 and 44 passing beneath the projections 32 to afford axial adjustment of the position of the winch means.

It will be noted that FIGURE 5 discloses an embodiment 30a of the winch means adapted to secure an opposite end of a vehicle or other load from the embodiment of FIGURE 4, and wherein similar parts are designated by similar reference numerals, a chain 24 being shown in stored position in the channel 16.

As seen in FIGURE 4, one of the anchor bars such as the bar 44 is adapted to engage with the ends of a pair of the registered projections 32 and to be held in the channel by flanges 52 and 54 at a desired location for the winch means 30, when the corresponding end of the winch means is elevated. The other bar 42 is then positioned beneath an adjacent set of projections 32 to assist in holding the winch means in position in the channel. Accordingly, the winch means may be retained in the channel at all times, but will also have complete flexibility in the adjustment of its position.

In order to accomplish positive locking engagement of the winch means with the projections 32 such as is shown in FIGURE 4, a gravity actuated lever lock member 56 is pivotally secured by means of a pin 58 or the like to a cross piece 60 interconnecting the side plates 38 and 40 intermediate the upper and lower ends thereof and at the end of the winch means opposite the point of attachment of the chain and adjacent the bar 44 for engaging the projections or stops 32 in locking relation. Desirably, the lever 56 has formed thereon a block or handle structure 62 which may be engaged manually or otherwise for turning the said lever.

As seen in FIGURE 6, in the disengaged position of the winch means 30, the lever 56 is displaced angularly so that the bottom edges of the side plates 38 and 40 rest on the bottom 46 of the channel. However, in order to elevate the winch means so that the bar 44 may lock in a desired position with registered projections or stops 32, said means may be raised so that the lever 56 drops into locking position by gravity or the lever 56 may be rotated to its vertical position as shown in FIGURE 7, whereupon the anchor bar 44 and the winch means are held against axial movement by the engagement of the anchor bar with the said projections 32. It will also be understood that other types of levers may be utilized within the scope of the invention, as for example, an eccentrically journalled cam element.

The positive action of the lever 56 in supporting the winch means 30, therefore, prevents inadvertent release of the winch means and consequent loosening of the tie down device 10 and damage to the load.

The drum 34 preferably has fixedly secured thereto a link 64 or fastening means for securing the chain structure, such as the chain 26, to the said drum. The chain structure may include a chain section 66 with an end link 70 connected to the grab hook 28 and an adjacent link 72 thereof connected to a length of chain 74 adjustably engaged by the grab hook and tied or otherwise secured to the frame of the vehicle. Other forms of chain structure may also be provided, as for example, a grab hook may be secured at the free end of a chain section attached to the winch, with a further holding member connected to the link securing the grab hook, as will be understood by those skilled in the art.

In accordance with the invention, the drum 34 defines crank engaging means which may include a polygonal recess 76 extending therethrough, or in one side thereof, so that a crank (not shown) may be inserted therein to rotate the drum and increase tension or take up slack in the chain. While other types of torque receiving means may be used to this end, it will be seen that the construction shown permits the operator to rotate the drum without having to reach the winch itself, so that a marked improvement in accessibility is afforded. In order to provide for rotation of the drum in a tensioning direction and to maintain the drum in secure holding relation to the load, ratchet means are utilized which include a gear 78 preferably formed integrally with the drum 34 adjacent one of the parallel winch plates such as the plate 38 and having gear teeth 80 which may each define a convex camming edge 82 and a concave locking edge 84. Coacting with the gear teeth 80 is a detent or pawl 86 pivotally mounted on the wall 38 adjacent the gear 78 by means of a pin or the like 90 secured to the detent for control by a lever 92 on the other or outer side of the wall or guide plate 38 and also fixed to the pin 90.

Accordingly, by insertion of the crank in the recess 76, the drum 34 and the gear 78 may be rotated to a desired extent to increase the tension on the chain 26 for holding the vehicles 12 securely. In the example shown in FIGURE 4, the drum and gear will be rotated clockwise and during such rotation the detent 86 will be cammed upwardly by the edges 82 on successive gear teeth 80, and will thereafter seat in complementary relationship between adjacent gear teeth 80, and to a locking edge 84 on one of the teeth, to hold the chain structure in load securing condition. Release of the chain from this condition may be accomplished simply by effecting a slight further amount of clockwise rotation, and the handle 92 may then be operated manually, or otherwise, to move the detent 86 out of the described locking engagement with the gear 78. The winch means 30a, of course, may be similarly adjusted by counterclockwise cranking action, in the example shown.

In operation, therefore, the winch means is guided slidably along the channel structure in which it is received, e.g., along the channel 16 with reference to the winch 30, until a desired location is reached. Thereupon the lever 56 swings into the vertical position shown in FIGURES 4 and 7 to engage the anchor bar 44 with the projections 32. After tension in the chain structure 26 has been released, as hereinabove set forth, the lever 56 may be returned to the position shown in FIGURES 5 and 6, and the chain may be stored in the channel as seen in FIGURE 5.

Accordingly, there has been provided a device which is self storing and substantially tamper proof, so that it cannot be removed inadvertently or otherwise, and which is effective for use in a wide range of operating conditions and for securing a variety of loads for transport or storage. Adjustment of the axial position of the winch or anchoring means is completely flexible, and tensioning and slack take-up of the flexible holding element or chain structure on the winch may be readily accomplished because access is afforded from one side of the load or vehicle by insertion of a crank in the winch as described. Also, a desired tension in the chain structure may be achieved by only partial or minimal rotation of the winch drum. The positive and automatic locking action afforded by the gravity actuated lever means for the winch renders the device proof against dislodgement and release of the load during shipment, and the assembly is further characterized by a simplicity and ruggedness of construction which obviate the need for special skills and techniques.

Although we have herein set forth and described our invention with respect to certain specific principles and details thereof, it will be understood by those skilled in the art that these may be varied without departing from the spirit and scope of the invention as set forth in the hereunto appended claims.

We claim as our invention:
1. In tie down apparatus adapted for securing a vehicle to a freight car,
   a channel member having:
   a bottom wall,
   side walls,
   and an opposed inwardly extending flange on each of said side walls in spaced parallel relation to each other and to said bottom wall,
   said flanges providing a plurality of uniformly longitudinally spaced projections in transversely aligned pairs,
   a winch assembly including opposite sides disposed between said flanges and projecting thereabove and with the winch normally bottomed in slidable relation on said bottom wall whereby the winch is adapted to be guided longitudinally along said channel member,
   a pair of aligned opposite anchor projections respectively on said side walls adjacent one end of the winch assembly and normally clearing said spaced depending projections for longitudinal adjustment of the winch assembly,
   rotary drum means on the portion of the winch assembly projecting above said flanges,
   flexible load-fastening means comprising an element attached to said drum means and adapted to draw the load-fastening means toward the winch on rotation of the drum in a direction toward said pair of side wall projections,
   said side wall projections being engageable between respective longitudinally spaced pairs of said channel projections whereby to anchor the winch assembly against longitudinal displacement along the channel member after said flexible element attached to a vehicle has been tightened by said rotation of the drum,
   and means adjacent to the opposite end of the winch assembly engageable under certain of the spaced projections and holding such opposite end of the winch assembly substantially against upward displacement during fastening element tightening rotation of the drum, said drum being mounted on an axis closer to said one end of the winch assembly than to said opposite end of the winch assembly, so that under tension of said fastening element pulling upwardly against said drum said opposite end of the winch assembly is deflected downwardly against said bottom wall.

2. A tie down apparatus as defined in claim 1 including means mounted on said one end of the winch assembly and releasably engageable with said channel member to lock the winch assembly with said side wall projections engaged between respective longitudinally spaced pairs of the channel projections when the load fastening means are relaxed or detached from a load.

3. A tie down apparatus as defined in claim 2 wherein said locking means comprise a lever pivotally mounted on said one end of the winch assembly and swingable downwardly to thrust against the bottom wall of the channel member and thereby hold the side wall projections in said engaged relation with the respective channel projections.

References Cited in the file of this patent

UNITED STATES PATENTS

| Re. 19,337 | Butterworth | Oct. 2, 1934 |
| 1,054,506 | Cockcroft | Feb. 25, 1913 |
| 2,024,444 | Friedlaender | Dec. 17, 1935 |
| 2,738,204 | Ibey | Mar. 13, 1956 |

FOREIGN PATENTS

| 382,757 | Germany | Oct. 5, 1923 |
| 869,480 | France | Nov. 7, 1941 |
| 1,008,460 | Germany | May 16, 1957 |